United States Patent
Andrews

(10) Patent No.: US 8,234,865 B2
(45) Date of Patent: Aug. 7, 2012

(54) THERMATICALLY OPERATED BYPASS VALVE FOR PASSIVE WARMUP CONTROL OF AFTERTREATMENT DEVICE

(75) Inventor: David Andrews, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 418 days.

(21) Appl. No.: 12/498,493

(22) Filed: Jul. 7, 2009

(65) Prior Publication Data

US 2010/0011764 A1 Jan. 21, 2010

Related U.S. Application Data

(60) Provisional application No. 61/081,200, filed on Jul. 16, 2008.

(51) Int. Cl.
*F02B 23/00* (2006.01)
*F16K 17/38* (2006.01)

(52) U.S. Cl. .......................................... 60/602; 137/468

(58) Field of Classification Search .................. 60/602, 60/605.2, 280; 137/468, 79; 417/407
See application file for complete search history.

(56) References Cited

U.S. PATENT DOCUMENTS

| | | | |
|---|---|---|---|
| 2,434,726 A | | 1/1948 | Udale |
| 3,963,042 A * | | 6/1976 | Bible ............................. 137/468 |
| 4,171,936 A * | | 10/1979 | Hageman et al. ............. 417/407 |
| 4,311,008 A * | | 1/1982 | Yamada .......................... 60/602 |
| 4,404,804 A * | | 9/1983 | Tadokoro et al. ............... 60/602 |
| 4,437,311 A | | 3/1984 | Iwamoto et al. |
| 4,441,356 A * | | 4/1984 | Bohl ............................... 73/23.2 |
| 4,445,815 A * | | 5/1984 | Fortmann ........................ 415/12 |
| 4,612,770 A * | | 9/1986 | Tadokoro et al. ............... 60/602 |
| 4,630,445 A * | | 12/1986 | Parker ............................. 60/602 |
| 4,813,232 A * | | 3/1989 | Hitomi et al. ................... 60/313 |
| 5,784,894 A * | | 7/1998 | Army et al. ..................... 62/402 |
| 6,018,949 A * | | 2/2000 | Brosecke et al. ............... 60/602 |
| 6,543,228 B2 * | | 4/2003 | Deacon .......................... 60/602 |
| 6,851,256 B2 * | | 2/2005 | Chamoto et al. ............... 60/280 |
| 7,210,295 B2 * | | 5/2007 | McEwen ......................... 60/602 |
| 7,905,091 B2 * | | 3/2011 | Kassner ....................... 60/605.1 |
| 8,037,683 B2 * | | 10/2011 | Wirbeleit et al. ............... 60/602 |
| 2002/0078934 A1 * | | 6/2002 | Hohkita et al. ................. 123/564 |
| 2003/0126860 A1 * | | 7/2003 | Uraki et al. ...................... 60/602 |
| 2006/0021346 A1 * | | 2/2006 | Whelan et al. ............... 60/605.2 |
| 2007/0089413 A1 * | | 4/2007 | Green et al. ..................... 60/600 |

FOREIGN PATENT DOCUMENTS

DE 4008508 A1 9/1990

OTHER PUBLICATIONS

European Search Report dated Dec. 1, 2010.

* cited by examiner

*Primary Examiner* — Thomas Denion
*Assistant Examiner* — Cameron Setayesh
(74) *Attorney, Agent, or Firm* — William G. Anderson; Stephan A. Pendorf; Patent Central LLC

(57) ABSTRACT

In order for automobile exhaust catalysts to function they must be at operational temperatures. When an engine starts from cold the vehicle, including the exhaust system and any after-treatment device located therein, is at ambient temperature. Since 60% to 80% of the total emissions emitted occur at engine cold start and idle up to 120 seconds, it is imperative that the catalyst function as fast as possible. This invention provides a passive thermatically controlled bypass valve to enable the exhaust flow to bypass the enthalpy loss incurred by driving the turbine wheel of a turbocharger, and thus more rapidly deliver heat to the catalyst or after-treatment.

10 Claims, 16 Drawing Sheets

THERMATICALLY OPERATED BYPASS VALVE FOR PASSIVE WARMUP CONTROL OF AFTERTREATMENT DEVICE

FIELD OF THE INVENTION

Wastegate valves, which allow some of the exhaust gas to bypass the turbine wheel, and fluidly connect to the turbine housing downstream of the turbine wheel, are actuated by any of: vacuum, boost pressure and electronics, and are controlled by any of: boost pressure, exhaust pressure and vacuum in a manifold, in which cases the control is passive, or: electronics commanded by the ECU of the engine or vehicle, in which case the control is active. The invention provides a new type of wastegate valve control and acuation.

DESCRIPTION OF THE RELATED ART

Turbochargers consist of five major groups of parts: a bearing housing (30) supporting a turbine wheel (31) and a turbine housing (39) on the hot side, and a compressor wheel (33) and a compressor housing (30) on the cold side. The turbine housing (39) is fed exhaust gas (5) from the engine, through an exhaust manifold (43). The turbine housing exhausts gas to a vehicle down-pipe (44) through an exducer (32).

In order for automobile exhaust catalysts to function they must be at operational temperatures. When an engine starts from cold the vehicle, including the exhaust system and any after-treatment device located therein, is at ambient temperature. Since 60% to 80% of the total emissions emitted occur at engine cold start and idle up to 120 seconds, it is imperative that the catalyst function as fast as possible, which requires being brought up to operating temperature. This invention provides a passive thermatic control means to enable the exhaust flow to bypass the enthalpy loss incurred by driving the turbine wheel of a turbocharger, and thus more rapidly delivers heat to the catalyst or after-treatment.

The basic function of wastegate valves is to provide an upper limit to the power to the turbine and thus protect the turbocharger from boost over-pressure, or limit turbo speed, depending upon the requirement. They operate in the upper regions of a turbocharger's performance map, as that is where the boost pressure is at a maximum. Passive exhaust wastegates do not operate at engine start-up as there is no significant signal from the inlet or exhaust systems to command them to do anything. Since the basic function of an exhaust wastegate is to control upper end boost or speed, there is no requirement for any low-end control.

The turbine stage is matched to the engine and compressor stage such that the turbine supplies sufficient power to drive the compressor. In order to limit turbo speed, or to limit boost pressure, the matching of the turbine may be such that there is excess power available to the turbine. The reasons for this may be to allow speed or boost control at altitude, where the turbo runs faster, while not overboosting at less than maximum altitude. Another reason may be to provide for more low-end speed, while controlling the upper end speed and thus boost pressure.

There is significant reason for the engine to do as much work as possible at start up, to elevate the temperature in the engine system, and thus the vehicle systems. For example, U.S. Pat. No. 5,079,921 (McCandless) teaches rotating a butterfly valve to the nearly closed position in the exhaust, to force the engine to do work against the exhaust backpressure, a form of artificial load, to thereby elevate the coolant temperature, which is then used to defrost the windscreen as fast as possible. "Operation of the system is enabled if the ambient air temperature is below 2° C., and also for the period that the elapsed time since start of engine is less than thirty seconds."

The task of turbochargers, on both Diesel and gasoline engines, is changing and more functions are being asked of the turbocharger on modern engines. Originally the turbocharger simply took in exhaust gas and converted some of that energy to driving a compressor to increase the density of air in the engine induction system.

In 1992 EPA emissions regulations for on highway Diesel engines promulgated that particulates shall be controlled, thus transient response would become critical, as it is in that mode that particulates are formed. By adding boost-controlled wastegates to the turbine side, the mean operating speed of the turbo could be increased, without increasing the upper speed limit, for example, when the vehicle is operating at altitude. By elevating the mean speed of the turbo, the transient response is improved, with a corresponding reduction in particulate emissions.

For 1998 and 2004 EPA emissions, more speed and/or boost control was required, while at the same time combustion temperatures needed to be reduced to reduce formation of NOx. This was accomplished in many ways, one of which was with the introduction of variable turbine flow to accomplish Exhaust Gas Recirculation (EGR) by controlling backpressure to drive the EGR charge into the induction system.

Over the past 20 years Diesel engine manufacturers have lowered $NO_x$, by 85%, and PM by 95%. For 2010 emissions, regulations mandate that emissions must be lowered a further 83%. The EPA intended for heavy-duty emissions, post 2007, to be "aftertreatment-forcing". For light duty, tier 2 bin 5, emissions requirements are forcing aftertreatment today. This will require some novel approaches in order to satisfy all of these goals.

It is worth noting also that for more fuel efficient drive trains and for hybridization, with frequent engine shut off, the average test cycle exhaust temperatures will fall below catalyst light-off temperatures which will exacerbate the catalyst light off situation.

The typical exhaust composition of a modern gasoline engine comprises:
  unburned hydrocarbons—HC
  carbon dioxide and carbon monoxide—$CO_2$ and CO
  nitrogen and oxides of nitrogen grouped under the heading of $N_2$ and $NO_x$
  unreacted oxygen—$O_2$ Modern Diesel exhaust composition is a little different from that of gasoline exhaust. Since they operate in a region very lean of stoichiometric, with an air/fuel ratio (A/F)>22, they produce less $CO_2$, CO, gaseous $NO_x$, and HC. When they run less lean, (i.e., more rich) the combustion yields higher temperatures, more complete combustion, which results in more NOx, accompanied by lower particulates.

However, in general, diesels do produce more solids and liquids. These solids and liquids are usually grouped and referred to as particulate matter (PM). The PM component of diesel emissions comprises:
  a. soluble organic fractions (SOF) from the lubricant
  b. dry carbon (which is known as soot)
  c. SOF from the fuel
  d. $SO_3$ and $H_2O$ Diesel emissions, and in particular, the PM part are measured differently in Europe and in the US. One situation faced by engine manufacturers is that the production of $NO_x$ and PM are usually opposed to each other. In the industry, this is referred to as the PM-$NO_x$ trade off. When engine combustion temperatures are higher, more $NO_x$ and less PMs are produced. However, when engine combustion temperatures are lower, less $NO_x$ and more PMs are produced so the engine manufacturers have to trade off these protocols. In the US, the normal mode is to reduce the PMs until they are inside the PM regulatory limits, commonly known as the "PM-box" and work with $NO_x$ to get it as low as possible, with the PMs still inside their box. In Europe, the PMs are measured at discrete engine operating points, which then require different solutions.

The US method measures PM as part of the Federal Trade Procedure (FTP) in which an engine operates through a range of pre-determined cycles representing different driving cycles and gathers the PM for the entire cycle thus trapping the PM developed during engine transients. The present invention deals only with the gaseous portion of emissions The PM portion is dealt with using particulate traps, for which elevated temperature is detrimental to their performance.

Most post-2007 US heavy duty Diesel engines come equipped with diesel particulate filters (DPFs). Catalyst-based DPFs, when used with ultra-low sulfur fuels, can achieve PM reductions in the region of 90%.

Essentially all new diesel engines use exhaust gas recirculation (EGR) protocols and catalysts for the reduction of $NO_x$. This leads to the need for after-treatment solutions for the reduction of dry soot and soluble organic fractions (SOF).

The emissions of diesel engines are much more complex than those of gasoline engines so the catalytic solutions are more complex, and definitely different.

For the reduction of THC, CO and TPM in Diesels, a Diesel Oxidation Catalyst (DOC) is in common use. The DOC must be at temperature in order for it to work efficiently. FIG. 14 shows a simple light off curve for a DOC from a bench-flow reactor. The Y-axis (144) represents the CO and THC conversion efficiency presented as percentage efficiency. The X-axis (143) represents the catalyst temperature in degrees centigrade. It can be seen that, in this case the catalyst has to be at 210° C. before the catalyst functions above 25% efficiency, and it functions at 90% efficiency at 220° C. There have been test cycles for catalyst light off which demonstrate light off as low as 175° C. So it can be seen that to have a system which elevates the catalyst temperature to operating regimes it must be capable of achieving between 175° C. and 210° C. in the first 60 to 120 seconds after cold start.

For $NO_x$ reduction in diesels, while EGR is used today in many cases, it does not satisfy the end user as fuel efficiency deteriorates. Some $NO_x$ reduction techniques used are selective catalytic reduction (SCR), which is used in combination with urea or ammonia, and $NO_x$ adsorbers, also known as lean $NO_x$ traps (LNT).

$NO_x$ adsorbers work by storing $NO_x$ under lean conditions, and then releasing and catalytically reducing the stored $NO_x$ under less lean (rich) conditions. $NO_x$ adsorbers are the reverse of automotive gasoline catalysts in that their ability to store $NO_x$ is diminished with increased temperature. Chart FIG. 15 depicts the Y-axis as the percentage adsorption, the X-axis shows the time in minutes. The chart shows that at 30 seconds into the cycle, the ability to adsorb is pretty equal. At 1 minute into the cycle the test at 200° C. (121) still has 100% adsorbing ability but the test at 500° C. (123) is nearly zero. At 2 minutes into the cycle, the test at 200° C. (121) is still at 100% adsorption capability, falling after that time, and the test at 500° C. has risen to just 5%, so this method would not be helped by the invention.

For a typical 4 cylinder gasoline engine, the engine-out emissions under an FTP cycle demonstrated. In FIG. 16 the left, or Y-axis (134) represents Engine HC in grams/mile, the right, or Y-axis (136) represents vehicle speed in km/hr. The X-axis (133) represents the time into the FTP cycle in seconds. To meet ULEV emissions, the emissions devices must be functional in 50 seconds. To meet LEV emissions, the devices must be functional in 80 seconds.

When the catalyst is at operating temperature, it converts some of the impurities in the exhaust gas, such as any unburned fuel, or combustion by-product, before the exhaust gas is emitted from the tailpipe into the atmosphere. The effectiveness of the catalyst, for the first few minutes of engine operation while still at ambient temperature, in a gasoline engine is almost non-existent. Between 60% and 80% of gaseous emissions are generated in these few minutes (some are as fast as 20 seconds) before the catalyst reaches its operating temperature of around 300° C. Gasoline engine catalysts operate at around 600° C. by the end of a trip. They generally will then cool back down to 300° C. within 30 minutes. Diesel catalysts are formulated for lower temperatures (200° C. to 300° C.). FIG. 13 shows the generation of engine-out hydrocarbons (131) versus time from engine start (133). The scale of hydrocarbon production is exhibited on the Y axis (134) and the speed of the vehicle is line (135) with the scale being the 2Y axis (136). It can be seen from the chart that the majority of the generation of HC starts at about 20 seconds after engine start (132), and continues at the growing high rate until 120 seconds after start.

The conversion of CO, by a catalyst, is temperature sensitive. FIG. 14 shows the conversion efficiency of a typical CO catalyst. The X-axis (143) depicts the temperature, in degrees centigrade, of the catalyst, at the catalyst. The Y-axis (144) depicts the conversion efficiency. It can be seen from the chart that the conversion efficiency (141) does not really begin until it kicks (142) at a temperature of 220° C.

There are several existent solutions to this "time to cat-light-off" problem, one of which is using phase change materials in the catalyst body to keep the catalyst substrate temperature close to the temperature required for the catalyst to function. Another is to close-couple the catalyst with the engine to minimize thermal inertia. Another development is to place a pre-catalyst prior to the turbine housing. There are many methods for dealing with this start-up non-thermally active catalyst problem. They are all complex, space invasive, and expensive.

U.S. Pat. No. 6,389,806 (Glugla) teaches that in order to shorten the time to reach operating temperatures an engine has variable displacement with retarded spark timing and air/fuel ratio biased to lean for the activated cylinder bank during and shortly afterward starting to further reduce the time required for catalyst light off.

U.S. Pat. No. 7,117,668 (Nashbum) teaches the use of a hydrocarbon reformer to supply the engine with fuel-lean reformate fuel mixture to ensure that all the fuel is burned while the exhaust converter is thermally non-functional.

U.S. Pat. No. 5,878,567 (Adamczyk) teaches a catalytic converter having a first highly loaded palladium or trimetal catalytic element containing palladium of relatively large particle size closely coupled to the engine exhaust manifold followed by one or more second catalytic elements having high oxygen storage capacity to provide protection against warmed up engine emissions break through is efficient in reducing cold start emissions through early catalyst light-off.

U.S. Pat. No. 5,410,872 (Adamczyk) uses an exhaust gas oxygen sensor to determine the amount of oxygen contained in the exhaust entering the catalyst, and an engine control computer connected with the air source and the oxygen sensor monitors the amount of oxygen contained in the exhaust and controls the amount of air supplied to the exhaust stream by the air source such that the available oxygen is slightly in excess of the stoichiometric requirement. In this manner, the light-off time of the catalyst is minimized.

There are devices which supply heat to the aftertreatment for the purposes of PM regeneration them or cleaning them. These devices are not intended to aid in faster catalyst light off. They deal with temperatures in the range of 700° C. to 800° C. U.S. Pat. No. 3,908,371 (Tadashi) teaches a method of and a system for cleaning exhaust gases. The engine supplies exhaust gas proportioned to provide an excess-air ratio of about 1.0 to 1.15 so that substantially no carbon monoxide and hydrogen are present in the exhaust gases emitted from the engine. A reducing agent, such as hydrocarbons, is admixed to the exhaust gases entering the reducing catalyst for removing an excess of oxides and reducing the nitrogen oxides in the exhaust gases while secondary air is supplied to the exhaust gases entering the oxidizing catalyst for assisting in the oxidization of the carbon monoxide and hydrocarbons remaining in the exhaust gases passed through the oxidizing catalyst. This then cleans the catalyst at high temperature.

US Application 2005/0019158 (Claus) teaches the benefit of sheet metal turbine housings, with double walled design, in order on the one hand to save weight but especially, and more importantly, to prevent excessive cooling of the exhaust gases of the engine in the case of a cold turbocharger, since the downstream catalyst has to be heated as rapidly as possible to the operating temperature by the exhaust gases in order to achieve its full effect.

EP Application 1,541,826 B1 (Bjornsson) teaches the manufacture of a welded, lightweight, jacketed, exhaust manifold. Further, it is taught to be advantageous that the "efficient mass", i.e. the mass that must be heated prior to catalyst light-off, is significantly reduced, since a smaller mass to be heated allows for a faster catalyst light-off. This patent does include the option of a wastegate but only in the sense that the pipe to the wastegate opening is jacketed and fabricated as part of the welded, jacketed, manifold. The patent mentions that the wastegate valve can be mounted in the wastegate at any occasion but preferably after all the welding is performed. The low thermal inertia feature of this design is favorable in reducing the catalyst light off period but the feature helping reduce the catalyst light off period is always present, not passively controlled.

So there is a need for a simple, low cost solution, which can operate independent of the software in the vehicle to aid in the reduction of the catalyst light of period.

SUMMARY OF THE INVENTION

At engine start-up, in order to minimize catalyst light off time, it is important that the greatest amount of heat energy possible gets to the catalyst. The present invention accomplishes this by providing a passive, thermatically operated valve, which opens a turbine bypass to re-route the heated exhaust gas flow around the turbine housing, rather than through the turbine housing, which housing would absorb the thermal energy. In this manner more of the thermal energy is delivered to the catalyst. By operating passively, there is no need for expensive and complicated electronic, or electric, controls to command the bypass valve to open and close.

BRIEF DESCRIPTION OF THE DRAWINGS

In the following, the invention will be described in greater detail by reference to the illustrative embodiments and the figures, wherein.

DETAILED DESCRIPTION OF THE INVENTION

On a turbocharged internal combustion engine the turbine housing includes a valve and a port, on the upstream side of the turbine wheel. The valve and port are fluidly coupled to the gas flow upstream of the turbine wheel. Said valve and port are in the closed, sealed, position while the engine is running at normal operating temperature, directing all the exhaust gas flow through the turbine wheel. The exhaust gas pressure provides pressure on the valve, to help in sealing, during normal engine operating conditions. However, at start up, when the engine is cold, the passive, bi-metallic valve distorts thermatically to an open position, thus allowing the pressure generated by the stationary, or slowly rotating, turbine wheel, to bias the exhaust flow through the valve and port to the low thermal inertia bypass system and thus pre-heat the after-treatment device(s), This has the effect of shortening the light-off period for the catalyst.

Figure 2:
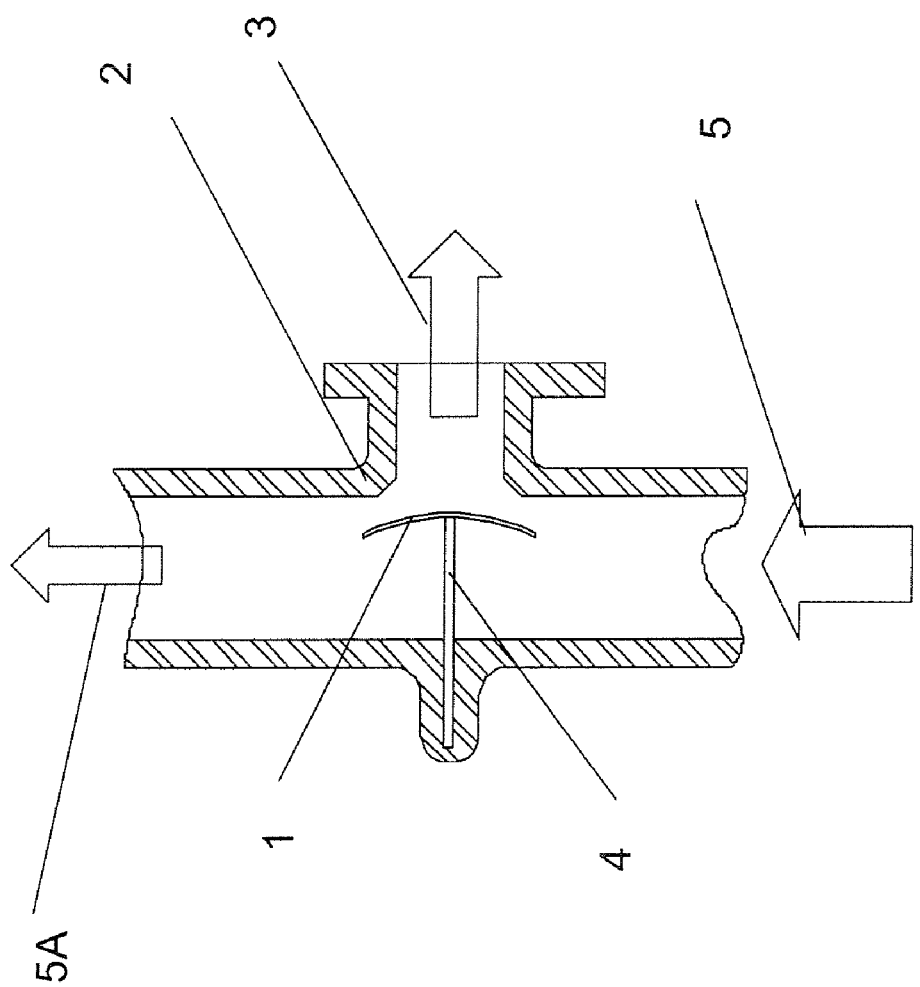
FIG. 2 is a representation of the valve configuration when the bimetallic bypass disc valve is open.

This valve is most preferably a bi-metal thermatically controlled device. This valve is configured such that, at cold start (FIG. 2) the passive, bi-metallic part of the bypass valve (1) is in the open condition. The bypass valve, being in the open position, allows exhaust flow (5) to travel to both the turbine wheel and to the exhaust system. The backpressure generated by the stationary, or slowly turning turbine wheel will cause the exhaust gas flow split into the bypass flow (3) which takes the path towards the path of least resistance, this being through the turbine bypass duct, connecting the turbocharger to the catalytic converter, downstream of the turbocharger, thus providing more energy to the catalytic converter than would be the case without the bypass. This energy heats the catalytic converter to its functional light-off temperature earlier than that if the bypass valve did not exist. The remaining exhaust flow (5A) travels through the turbine housing, through the turbine wheel (31) and thence through the exhaust system.

Figure 3:
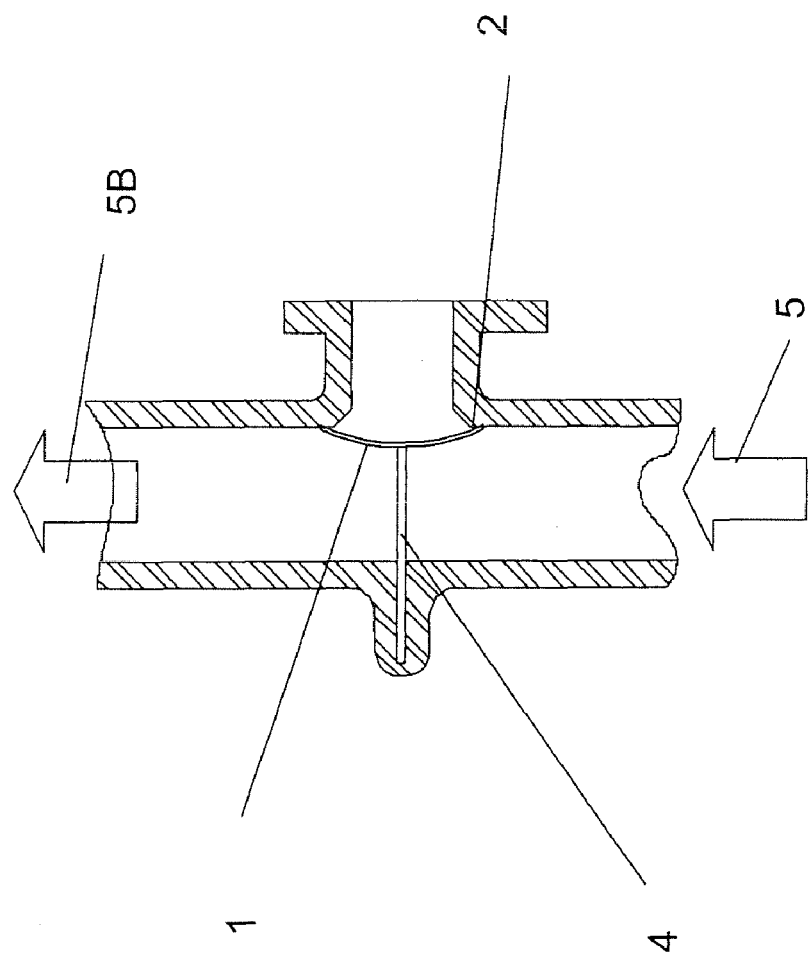
FIG. 3 is a representation of the configuration when the bimetallic bypass disc valve is closed.

As the engine exhaust temperature rises, the passive, bi-metallic part FIG. 3 (1) of the bypass valve snaps closed forcing all the incoming exhaust flow (5) through the turbine housing (39) to the turbine wheel (31). The temperature at which the bi-metallic valve snaps closed is a function of the metals or alloys used in the bimetallic element and the temperature at which the valve optimally blocks and unblocks the bypass port is determined experimentally based on the relationship between the temperature at the catalytic converter and the temperature at the bypass valve.

In the case of an engine which employs the use of a variable geometry turbine stage the vanes are moved to the closed position at engine shut down. The passive, bimetallic, bypass valve opens when the exhaust temperature cools, which it will do as the engine is no longer running. The passive, bimetallic, bypass valve then opens at cold start up, or start up under conditions in which the catalyst is below light-off temperature. Closing the VTG vanes will increase the pressure drop in the exhaust flow across the bypass valve and drive more exhaust gas through the bypass than would be possible with the vanes in the open position.

This passive, bimetallic valve assembly can be mounted on the turbine housing, or on the exhaust manifold upstream of the turbine. The exemplary embodiment FIG. 5 of the invention has the passive bimetallic disc mounted on a mount (4) with the disc (1) sealing a port in the turbine housing (39). The function of the device requires that it resides between the combustion chamber and the turbine wheel.

Figure 4:
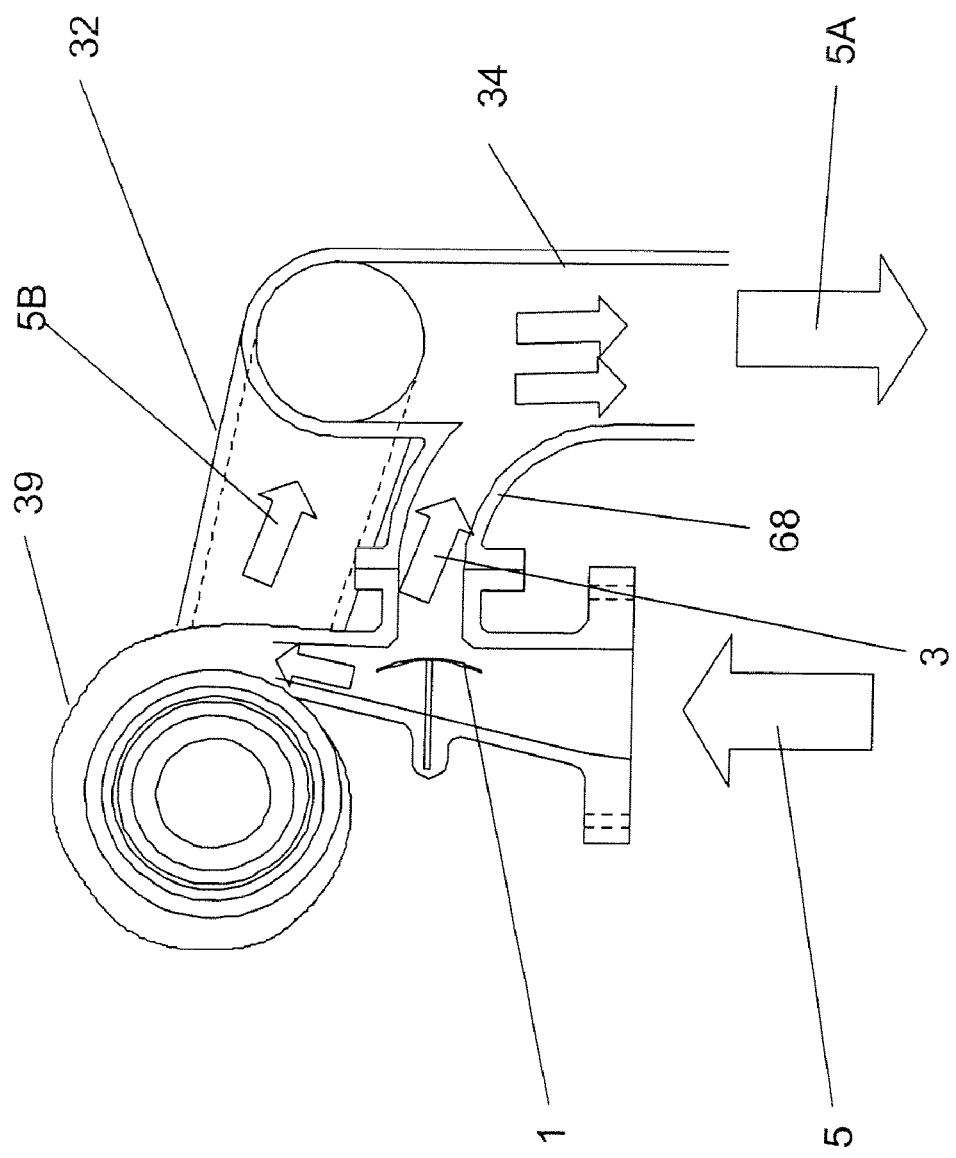
FIG. 4 is a representation of the engine configuration in which the bimetallic bypass disc valve connects the turbine stage, with the exhaust pipe, at a point, downstream of the turbocharger.

In the exemplary embodiment FIG. 4, a heavy walled tube or casting (33) is used to connect the turbine housing (39), with the exhaust pipe (34). Some of the incoming exhaust gas flow (5), from the exhaust manifold is diverted through the valve (1), to the bypass duct (49) where it joins the remainder of the incoming gas flow (5B) from the turbine housing and the total flow (5A) then travels through the down-pipe (34) to the exhaust pipe, and thence to the catalytic converter or aftertreatment device.

Figure 5:
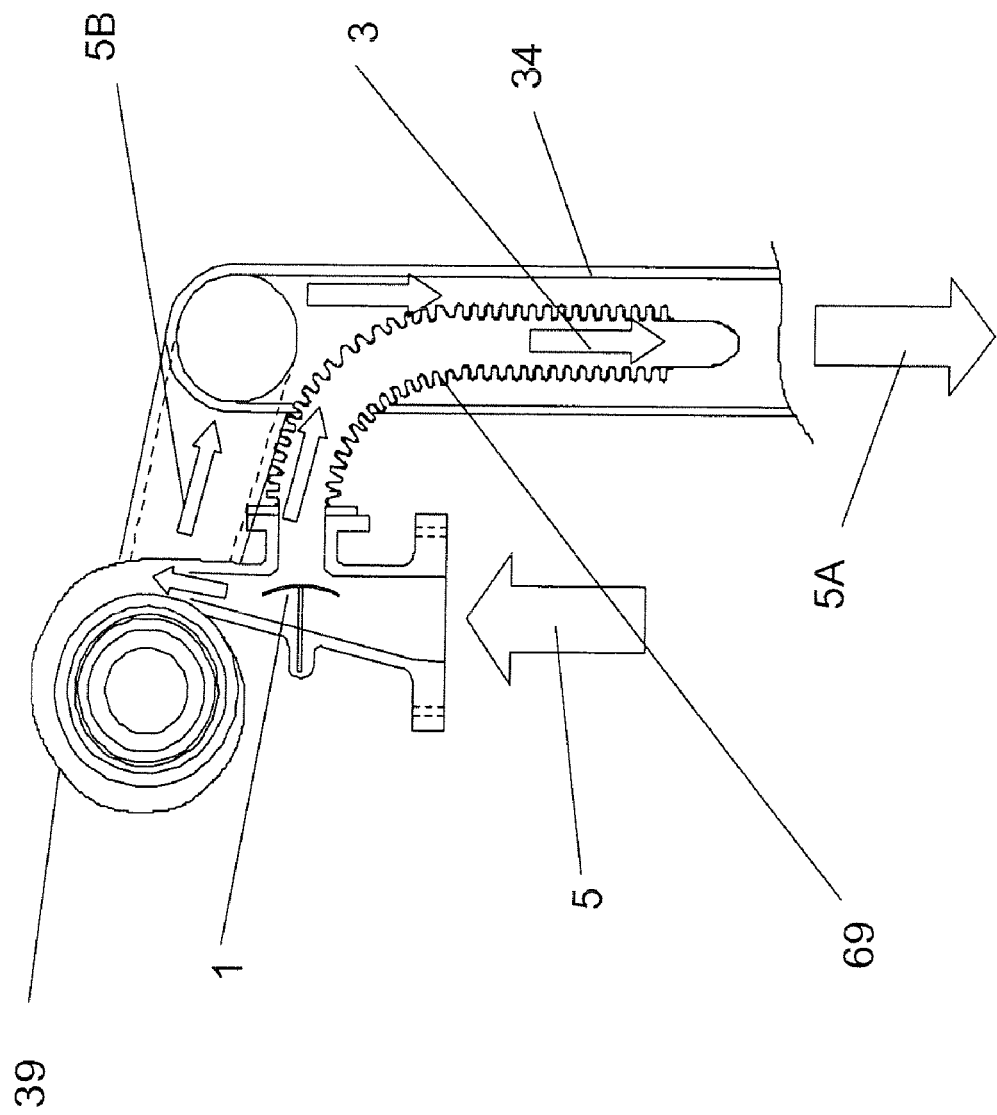
FIG. 5 is a representation of the engine configuration in which the bimetallic bypass disc valve connects the turbine stage with a low thermal inertia bypass pipe, to the exhaust pipe downstream of the turbocharger.

In another embodiment, to minimize thermal inertia, so that the maximum of heat energy is delivered to the aftertreatment device, a thin superalloy, flexible, convoluted duct FIG. 5, (69) is used to convey the bypassed gas (3). The superalloy, preferably an iron based superalloy, contains one or more of Ti, Nb, B, Hf and Zr, and suitable examples include SUH660, Inconel 713C, and Incoloy 800H. In this embodiment of the invention, the low thermal inertia bypass duct (69) connects the turbine housing (39) to the exhaust pipe (34), bypassing the remainder of the turbine housing (39). By connecting the turbine housing, to the vehicle down-pipe (34) with a low thermal inertia duct, less of the exhaust heat is absorbed by the duct than would be the case if the duct was a heavy walled casting. So more of the exhaust energy is available to heat the catalyst. The vehicle down pipe (34) ducts the exhaust flow to the aftertreatment device located further down the vehicle.

Figure 6:
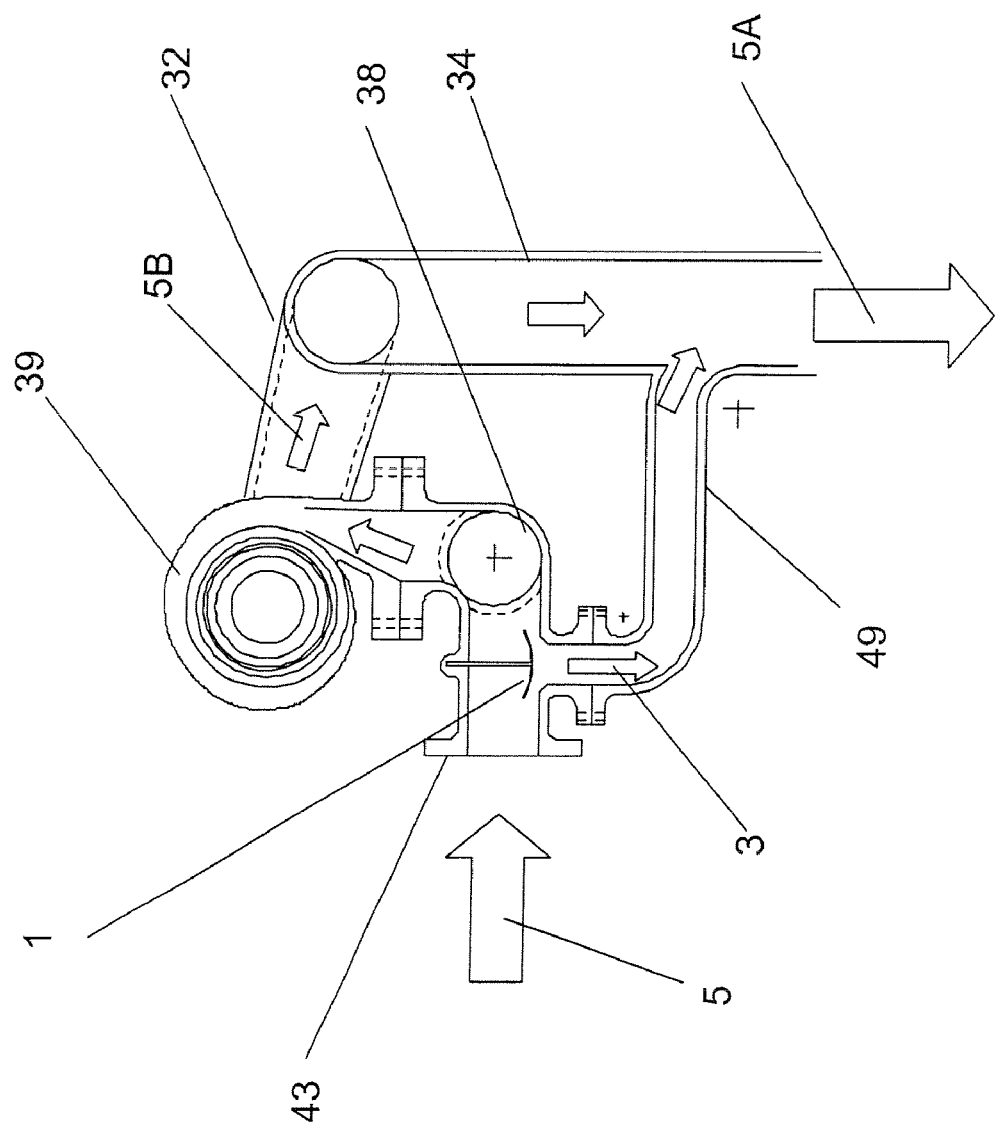
FIG. 6 is a representation of the engine configuration in which the bimetallic bypass disc valve connects the exhaust manifold with the exhaust pipe, at a point downstream of the turbocharger.

In another embodiment FIG. 6 of the invention, the exhaust gas (5) is taken from the exhaust manifold (43). The passive, bimetallic valve (1) is mounted to the exhaust manifold to take some exhaust gas (3) such that it bypasses the turbine housing (39) and ducts it through a thick-wall tubular, or cast bypass duct (49) to the vehicle down-pipe (34), where it joins the non-bypassed exhaust gas (5B) and thence to the exhaust pipe and the catalytic converter.

Figure 7:
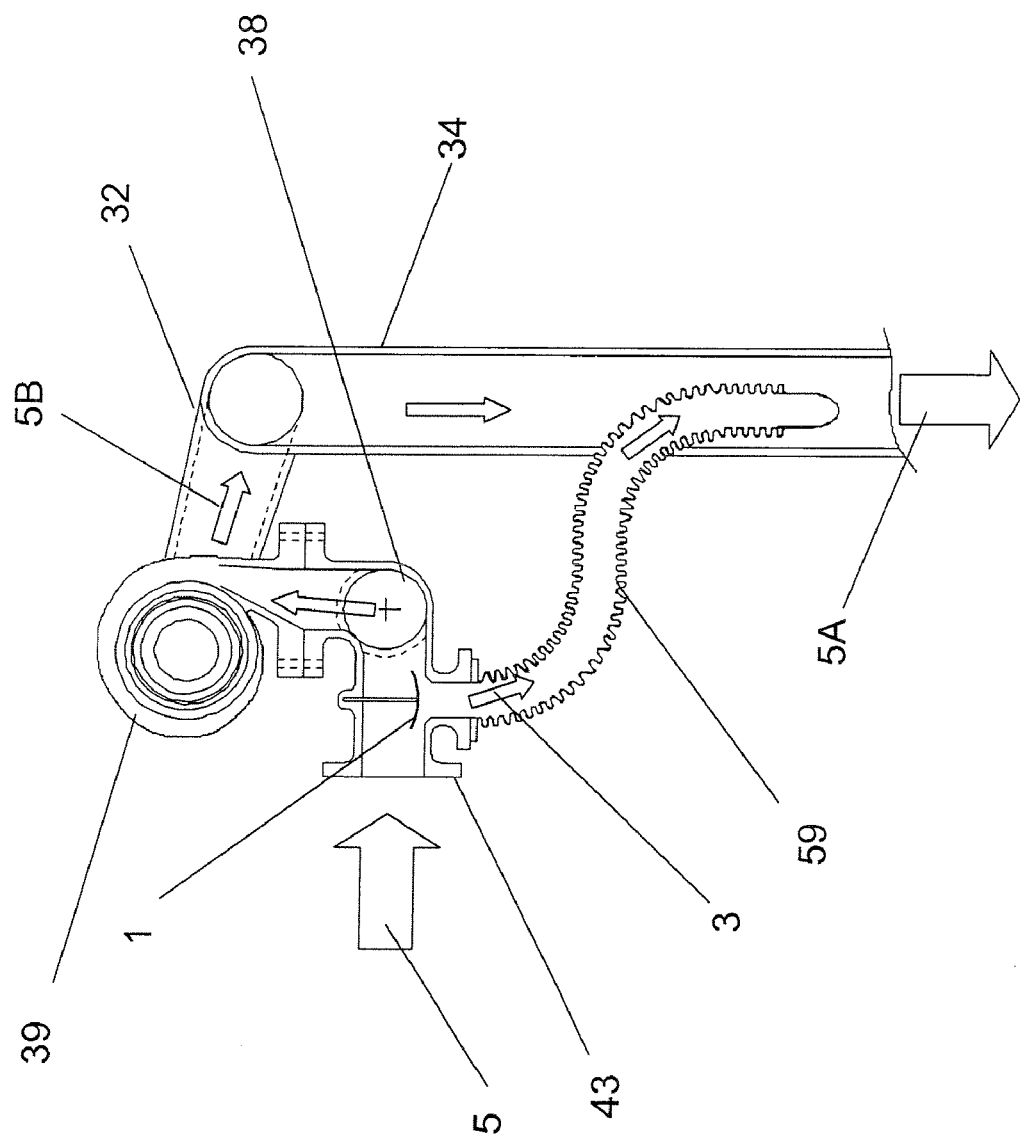
FIG. 7 is a representation of the engine configuration in which the bimetallic bypass disc valve connects the exhaust manifold with a low thermal inertia bypass pipe, to the exhaust pipe downstream of the turbocharger.

In another embodiment FIG. 7 of the invention, the exhaust gas (5) is taken from the exhaust manifold (43). The passive, bimetallic valve (1) is mounted to the exhaust manifold to take some exhaust gas (3) such that it bypasses the turbine housing (39) and ducts it through a thin flexible, convoluted superalloy duct, (59) which is used to convey the bypassed gas (3). In this case, the low thermal inertia bypass duct (59) connects the turbine housing (39) to the down-pipe (34), bypassing the turbine wheel. The down-pipe connects to the vehicle exhaust which pipe directs the flow of these gases to the catalytic converter located further down the vehicle.

By connecting the exhaust manifold to the vehicle down-pipe (34) with a low thermal inertia duct, less of the exhaust heat is absorbed by the duct than would be the case if the duct was a heavy walled casting, thus more of the exhaust energy is available to heat the catalyst. The term "thermal inertia" is a bulk material property related to thermal conductivity and volumetric heat capacity, and there are a variety of ways to render piping low in thermal inertia. "Low thermal inertia" as used herein means less lower than a cast iron pipe of same thickness and dimensions. The thermal inertia of a material is defined as a the square root of the product of the material's bulk thermal conductivity and volumetric heat capacity, where the latter is the product of density and specific heat capacity:

$$I = \sqrt{k\rho c}$$

Figure 8:
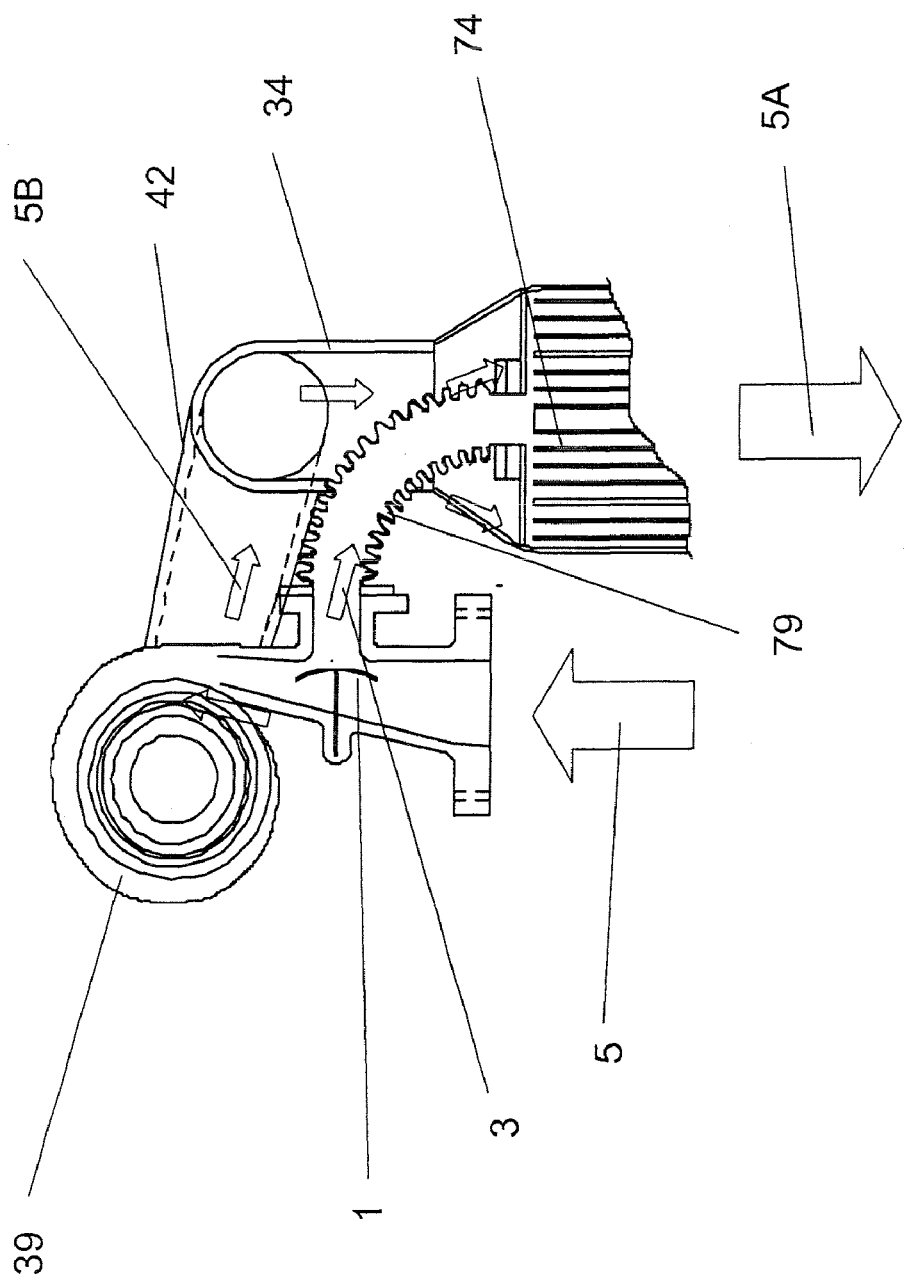
FIG. 8 is a representation of the engine configuration in which the bimetallic bypass disc valve connects directly to the aftertreatment device, with a low thermal inertia bypass pipe.

A further embodiment of the above invention, in a manner similar to the embodiments above, the passive bi-metallic valve is located either on the exhaust manifold, or in the turbine housing, the latter is shown in FIG. 8. In this embodiment the thermal inertia of both the down-pipe and the exhaust pipe are reduced by direct coupling the catalytic converter (74) to either the turbocharger exhaust pipe (42) or the down-pipe (34). The bypassed exhaust gas (3) is ducted, by a low thermal inertia pipe (79), directly to a duct upstream of the catalytic converter. Whether this duct is titled as exhaust pipe or down-pipe is arbitrary. What is important is that the catalytic converter is located as close as possible to the turbocharger.

Figure 9:
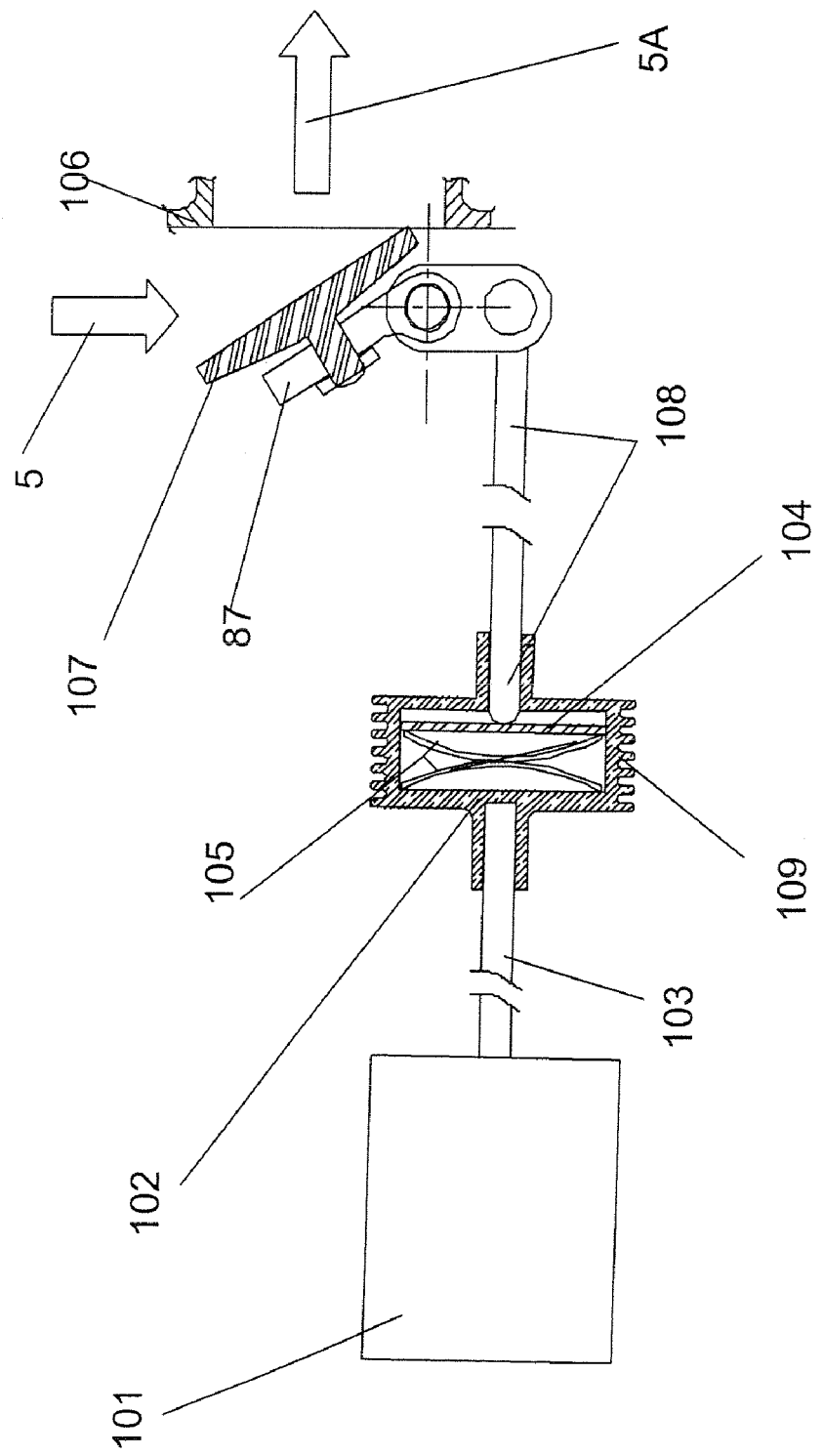
FIG. 9 is a representation of a wastegate actuation system with the bimetallic option on the actuation rod in the open position.

An embodiment of the invention is used in the case of an engine in which the turbocharger employs the use of a wastegate for normal operating conditions. The wastegate operation employs a like thermatic, bi-metallic, device to enable the existing wastegate port to be used as the bypass port. In the case of a wastegate, the device can take two paths:

In the first path a typical wastegate valve, FIG. 9 (107) is employed to control the engine boost by the use of an actuator (101). The actuator can be driven by vacuum or pressure, by hydraulic pressure, or electrically. These all result in operation in the same manner. The engine signal tells the actuator to open to control the pressure to the turbine wheel. Once open, the undesired exhaust flow bypasses the turbine wheel and re-enters the exhaust pipe downstream of the turbine wheel to provide energy to the catalytic converter.

Figure 1:
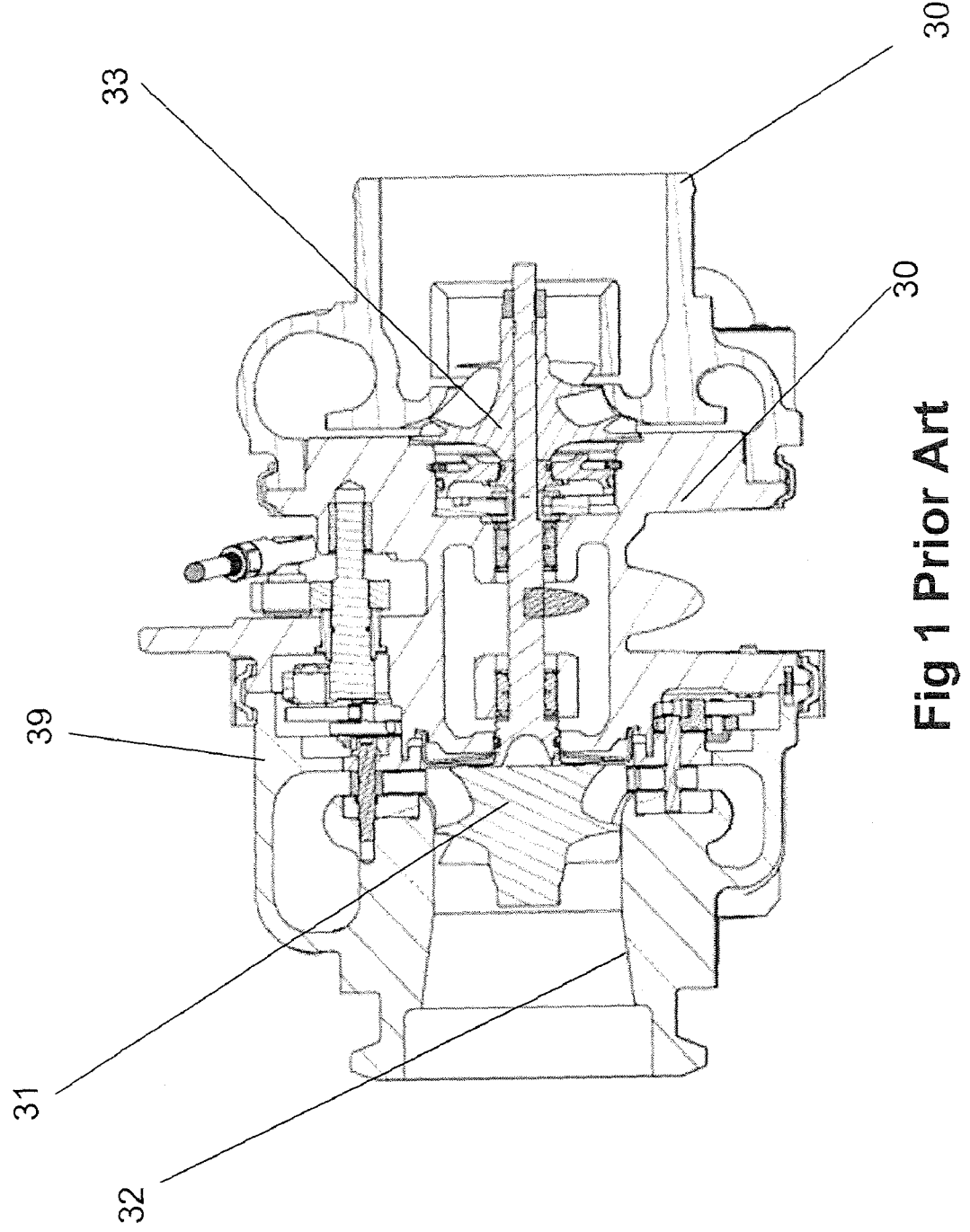
FIG. 1 is a section of a typical turbocharger.

In this first path of the embodiment of the invention above, the shaft connecting the wastegate driving arm (87) to the actuator (101) is interrupted by a passive bimetallic control assembly, mounted between the actuator (101), and the wastegate valve (107). As in the case of the exemplary embodiment in FIG. 1 the passive bimetallic disc (1) has snapped to the open position, which extends the effective length of the actuator rod (103,108), rotates the valve arm (107) to open the valve (106) off its seat (106). A plurality of bimetallic discs reside in a housing. The discs (105) are arranged such that they react against the body of the housing (102) towards one direction, and a slider plate (104), which reacts against the actuator rod (108) in the other direction. The housing may have fins on the outside of it to make it sensitive to radiated heat energy from the engine systems. The actuator rod (103) is fixed to the housing in one direction. The other actuator rod (108) is connected to the valve arm in the other direction. This arrangement could be reversed, the choice of which rod connects to which part of the housing assembly (housing, or slider plate) is arbitrary.

Figure 10:
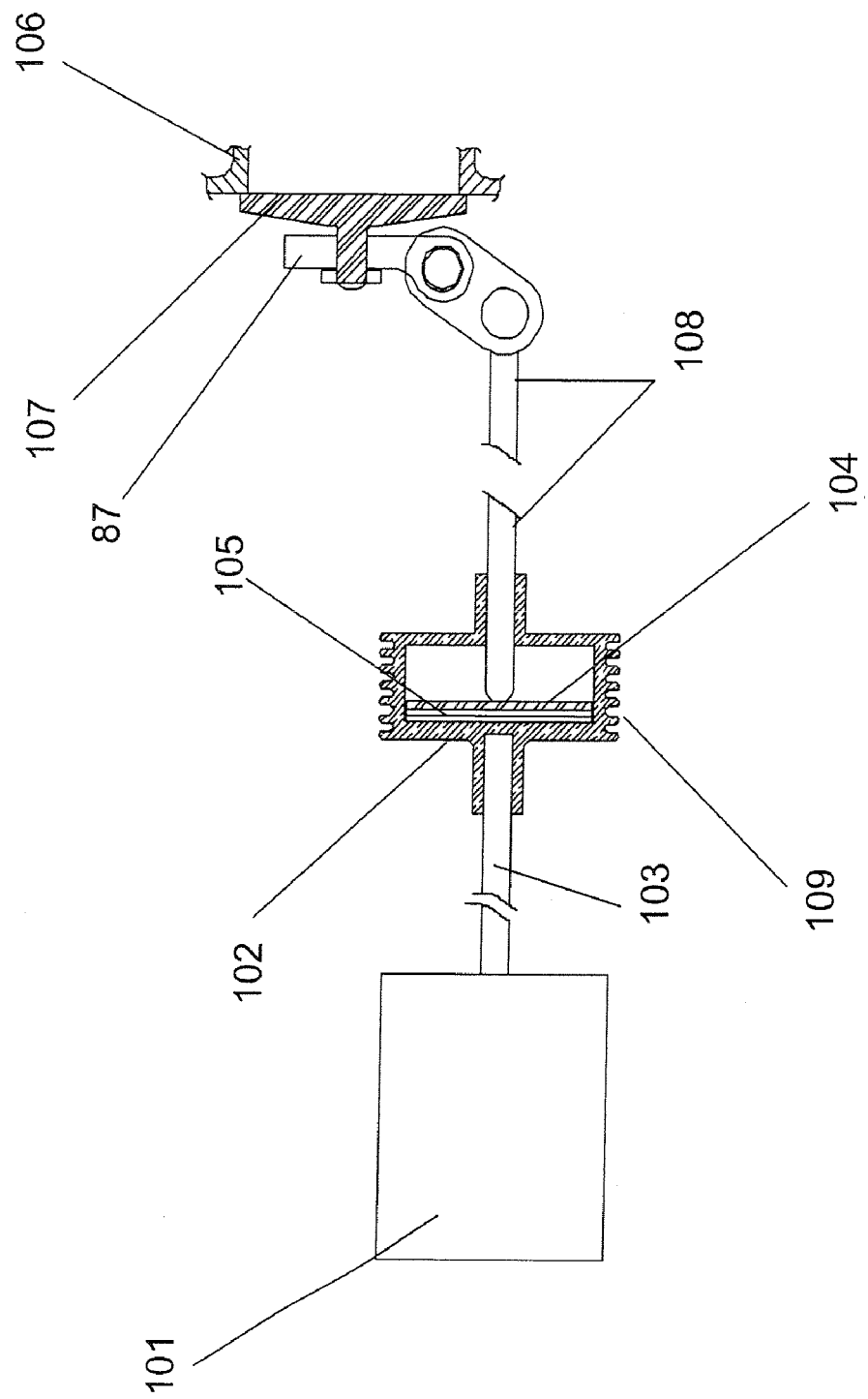
FIG. 10 is a representation of a wastegate actuation system with the bimetallic option on the actuation rod in the closed position.

During engine power operating conditions, which may subsequently require wastegate actuation, the wastegate valve (107) is held in position by a typical actuator as shown in FIG. 10 (101). The engine operating conditions provide heat to the body (102), possibly through thermally conductive fins on the outside of the housing containing the bimetallic discs such that the actuator provides a resistance to the actuator rod (103). In the heated condition, the bimetallic discs snap to the minimum displacement flat condition, which moves the lower actuator rod (108) towards the actuator. This pulls the valve arm (87), which rotates about the shaft (85), in a direction opposite to that of the opening motion, above, to close the wastegate valve. This closing of the wastegate valve allows all of the exhaust gas to flow from upstream of the valve to the turbine wheel.

Figure 11:
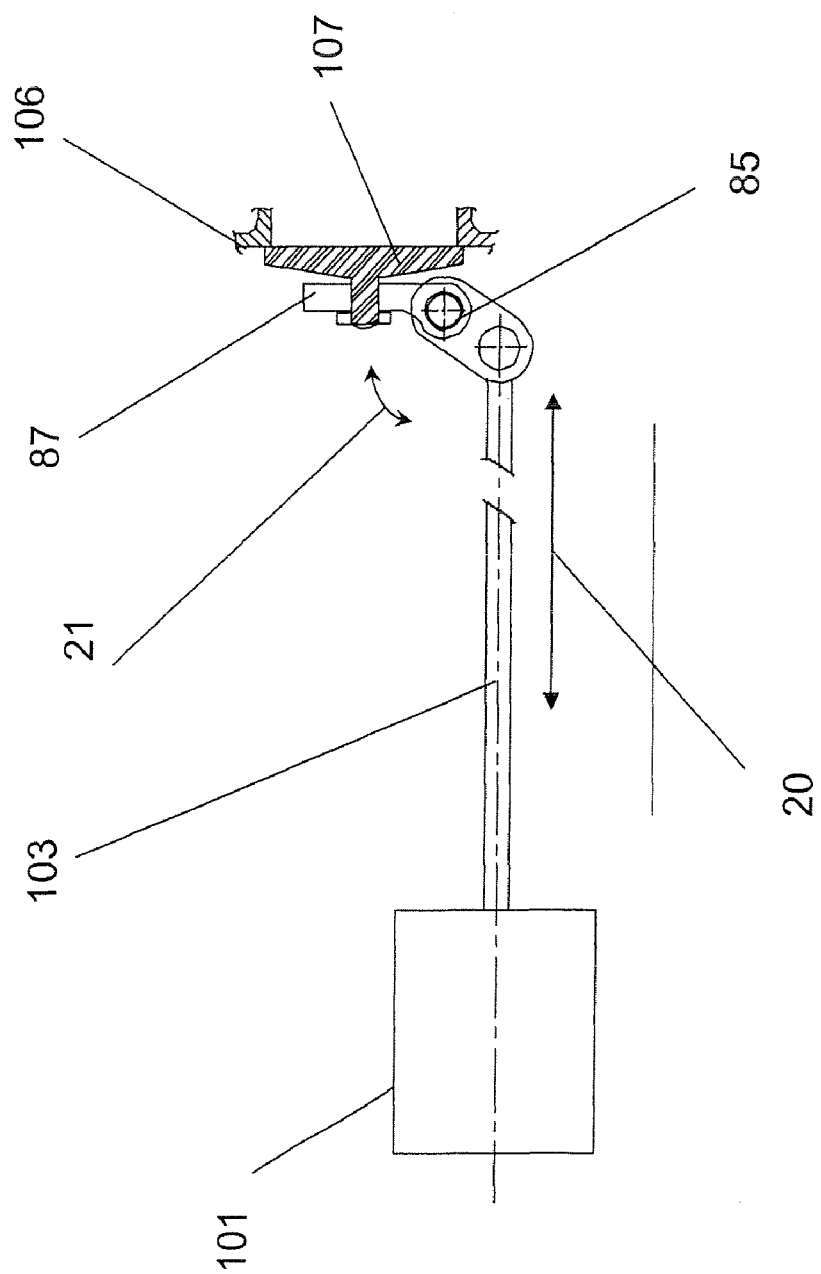
FIG. 11 is a representation of a typical wastegate mechanism.

A typical wastegate FIG. 11 has a typical actuator (101), an actuator rod (109), a valve arm (87) to which is mounted a wastegate valve (107). The actuator extends, or retracts the rod, in the directions (21) from, and toward, the actuator to operate the valve arm (87), which rotates (21) about its shaft (85). The valve arm rotates to open and close the valve (107) against its seat (106). This is the normal operation of a typical wastegate valve.

Figure 12:
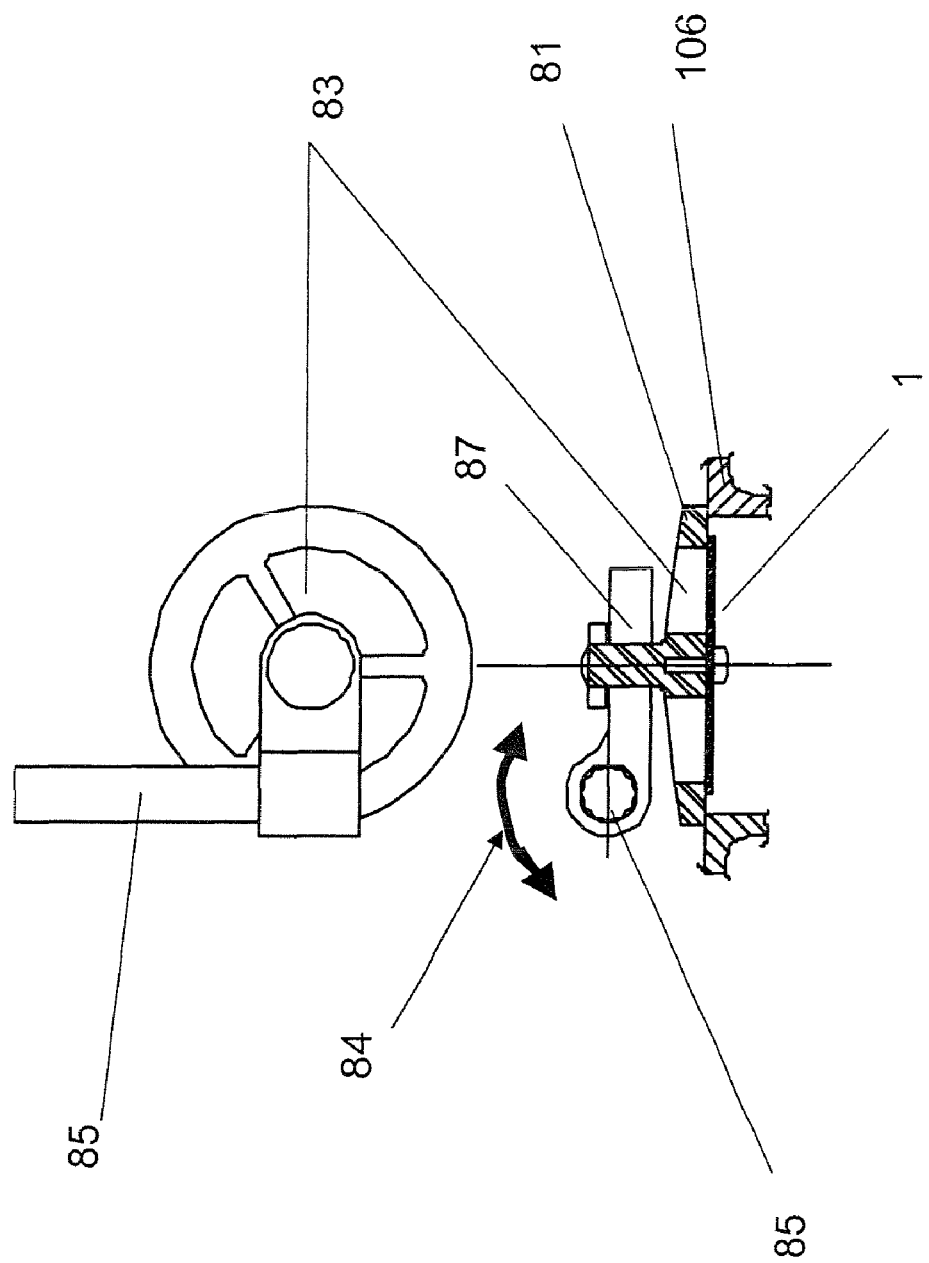
FIG. 12 is a representation of a wastegate valve with the addition of a bimetallic bypass option, in the closed position.
Figure 13:
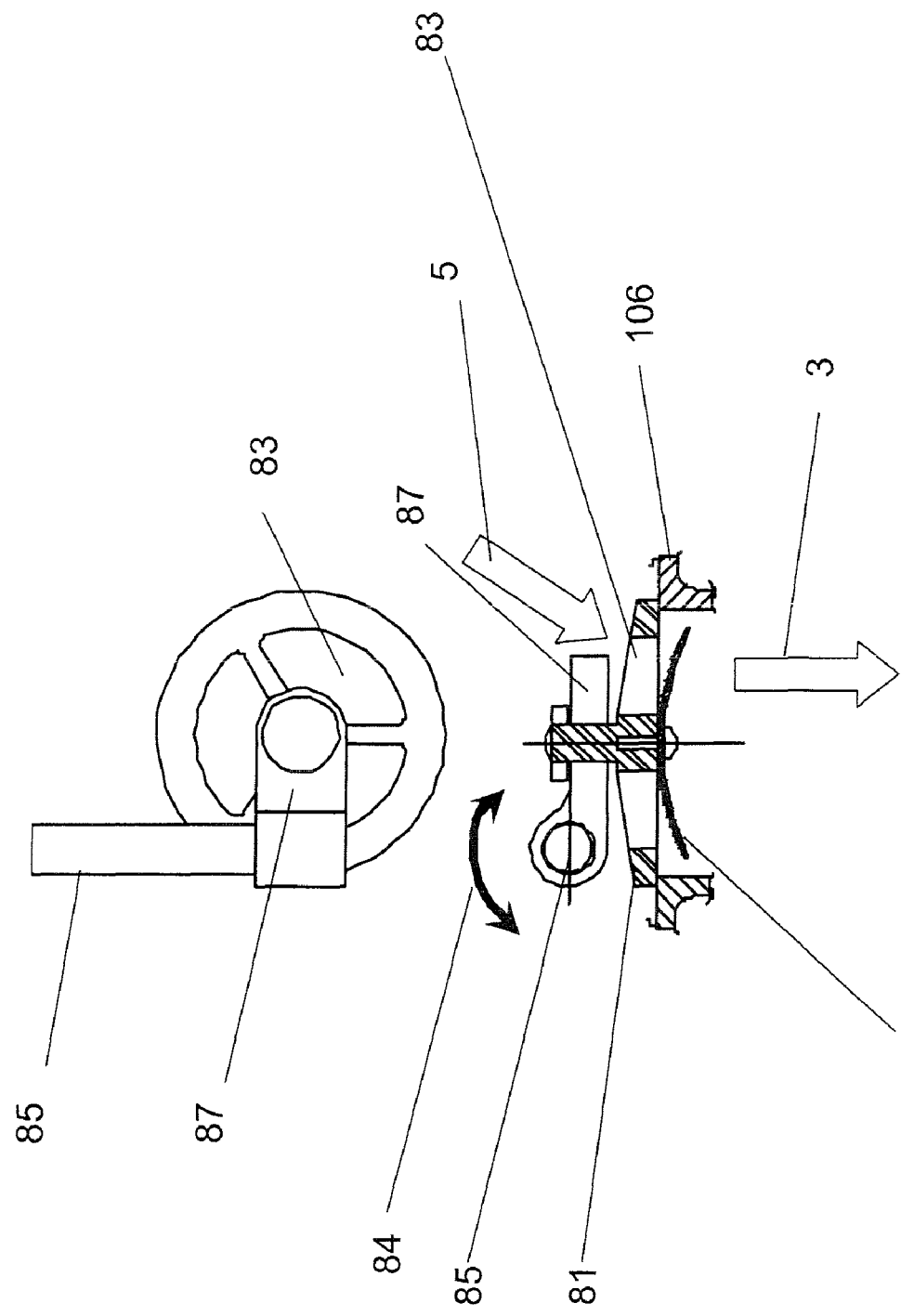
FIG. 13 is a representation of a wastegate valve with the addition of a bi-metallic bypass option, in the open position.
Figure 14:
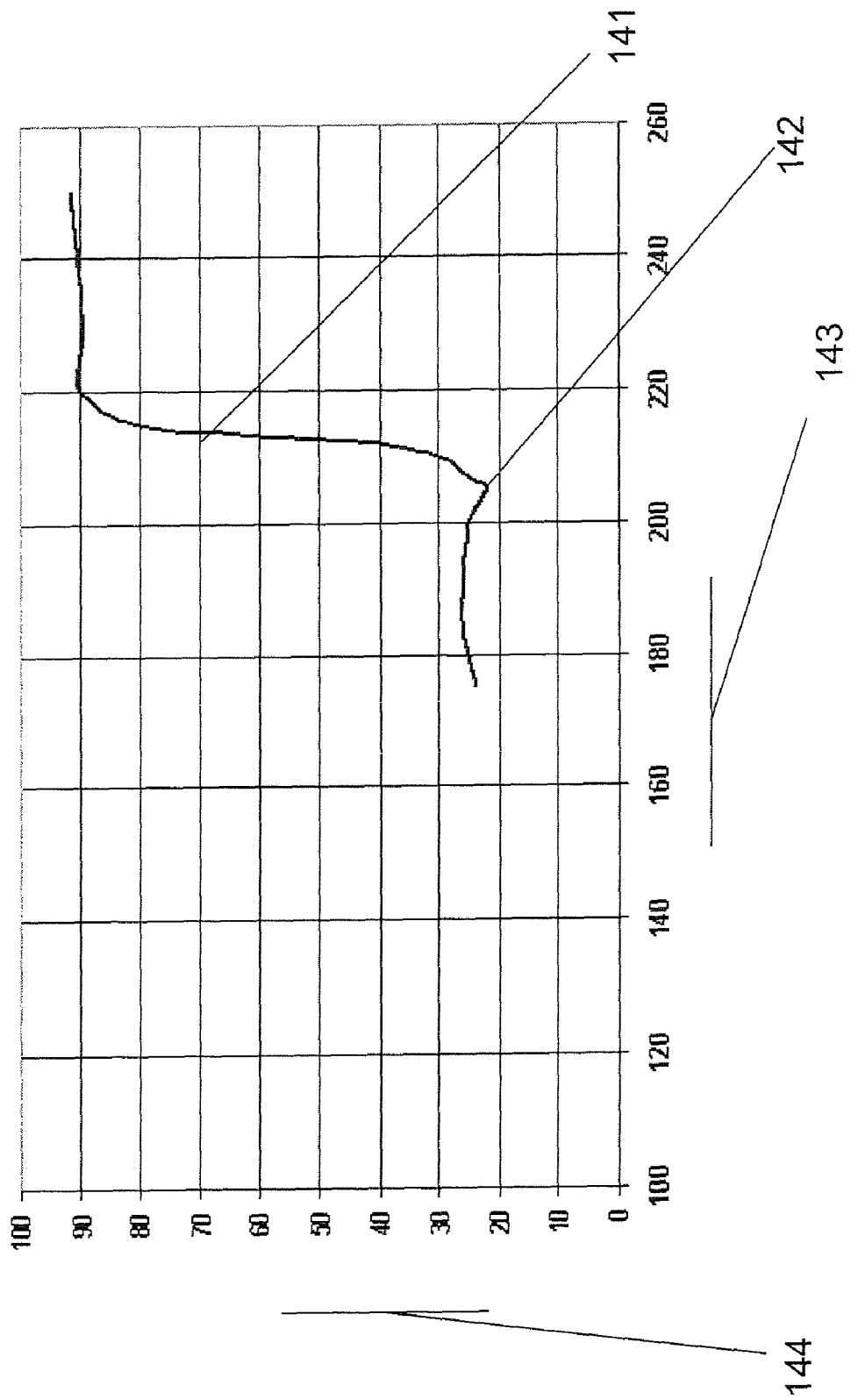
FIG. 14 is a chart showing CO conversion efficiency versus temperature (BorgWarner presentation to SAE Congress 2008)
Figure 15:
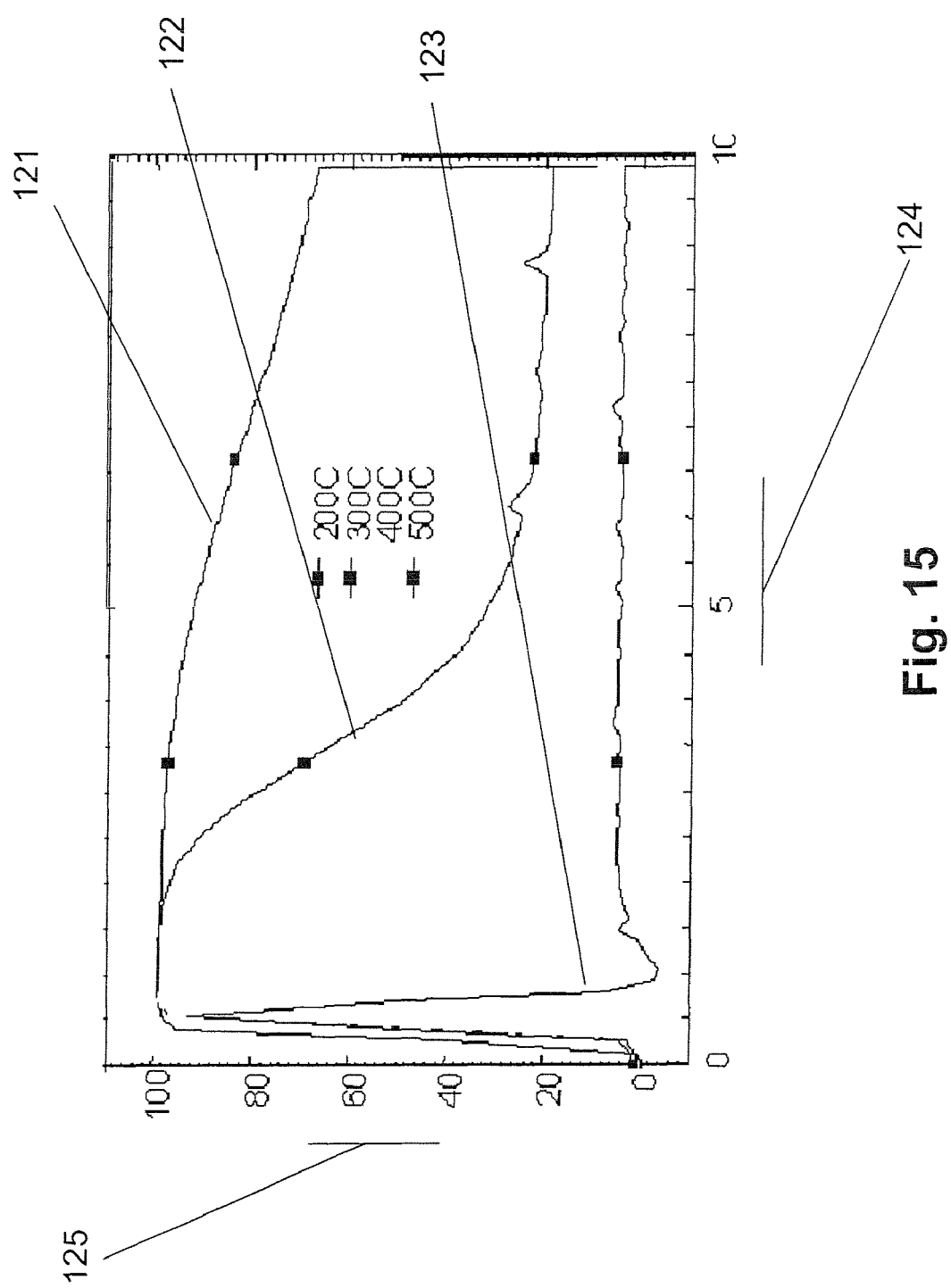
FIG. 15 is a chart showing $NO_x$ adsorption efficiency Vs time and temperature (DieselNet Technical Report December 1997)
Figure 16:
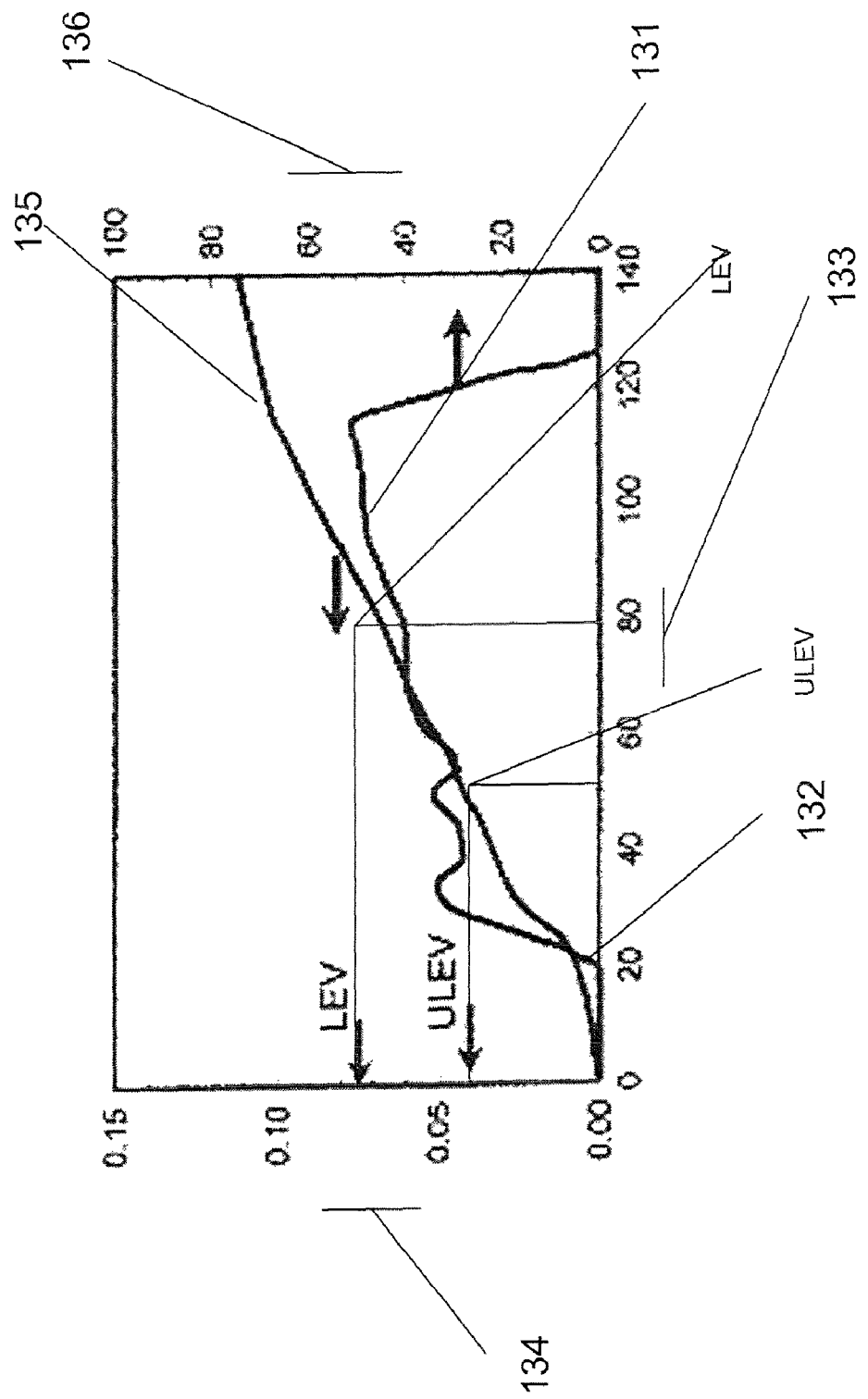
FIG. 16 is a chart showing gasoline cold start timing (Catalytic Air Pollution Control from the book "Catalytic Air Pollution Control", Edition 2, Heck and Farrauto.

In the second path of the embodiment FIG. 12, the wastegate valve consists of a valve head (81) into which are formed windows or ports (83). Attached to the valve head (81) are one or more passive, bimetallic discs. In the cool condition (ie when the engine is not making much, if any exhaust temperature) the passive bimetallic disc(s) are in the deformed or cupped, open state FIG. 13. In the heated condition (ie when the engine is making exhaust temperature) the disc(s) are in the sealed or flat state, FIG. 12. Thus when the bimetallic disc is open, exhaust gas is able to flow through the valve head to the catalytic converter to produce a shorter light-off period. When the exhaust is cold, the passive, bimetallic disc(s) are in the flat, closed state, which allows no exhaust gas past the valve head.

The valve may be for example as shown in U.S. Pat. No. 4,247,041 (Kazuhko) teaching a thermally responsive valve device for automobile emission control, wherein two passages close and open simultaneously by the action of a bimetallic disc in response to changes in temp. The bimetal disc has one layer of metal whose thermal coefficient of expansion is predetermined. As a result, the bimetal disc may move by snap-action to the reverse dish-shape at a predetermined temperature.

The bimetallic disc may be manufactured as taught in U.S. Pat. No. 3,933,022 (Pelz). This patent teaches an improved method for controlling the snap-action characteristics of thermally expansive bimetallic members. The improvement comprises heating the bimetallic member during the forming operation which provides the member with said snap-acting characteristics to a temperature substantially greater than the upper temperature limit which defines said characteristics.

Another passive thermal valve is taught in U.S. Pat. No. 4,026,464 (Doherty). As best shown by FIG. 5, the bimetallic assembly comprises a carrier or support housing, a first and a second dish-shaped bimetallic element, and a wave spring. Dish-shaped bimetallic elements each have one layer of metal of a low thermal coefficient of expansion and another layer of metal of a somewhat higher thermal coefficient of expansion so that at respective predetermined temperatures the elements will snap over center to an inverted dish-shaped configuration. The metal materials and the amount of pre-forming or dishing for the two bimetallic elements are chosen such that the two snap over center at different temperatures. In this patent the bimetallic discs snap at different temperatures to provide different porting options for these temperatures.

Another passive thermal valve is taught in U.S. Pat. No. 4,076,172 (Inada). The bimetallic assembly comprises of a support housing with an inlet port and first and second outlet ports. The thermostatic bimetal disc disposed within the body is responsive to a variation in temperature to change the curvature thereof from a first position to a second position thus moving a spool valve to control the flow from the inlet to the first position. A further change in temperature moves the spool valve to control the flow from the inlet to the second position. In the case of the thermally controlled bypass valve the bimetallic disc is actually wetted by the controlled fluid and is, in fact, the valve itself.

Another passive thermal valve is taught in U.S. Pat. No. 4,142,676 (Williams), teaching an option to change the flow in a conduit. A bimetal valve is disclosed which is adapted to open and close a fluid flow conduit, or change flow paths from one to another due to the snapping action of bimetal discs in response to ambient temperature changes of the valve. In a first embodiment, there is used a combination of two bimetal discs and a valve seat cooperative therewith, thereby opening and closing flow of fluid between two ports. In a second embodiment, there is used a combination of two bimetal discs and a hold-down plate having a valve body thereon, thereby opening and closing flow of fluid between two ports. In further embodiments there are other options to change the fluid paths in multiple, selected directions. Each fluid direction being a 100% flow choice. In the case of the thermatically controlled bypass valve the flow is only partially re-directed.

U.S. Pat. No. 4,144,998 (Wakabayashi) teaches that a valve assembly, which allows some flow in the first position through two passages (16) and (18). As the engine temperature heats up the bimetallic member snaps over and causes a change in communication from passage (16) to (18), to passage (18) to (20). In this case the flow change is full flow due to the snap action of the bimetallic member. The design of this valve is such that the dual action avoids permanent deformation in the elastomeric seal, due to excessive compression of the seal. In the thermatically controlled bypass valve there are no elastomeric seals as the valve face is itself the bimetallic disc.

U.S. Pat. No. 4,382,545 (Satomoto) teaches that a bimetal-actuated temperature responsive valve assembly, which included two bimetal, discs. These discs are arranged such that the flow control is adjusted in steps. At the first temperature, the valve is fully opened. At a second, pre-determined temperature, the valve is partially opened, and at a third pre-determined temperature, the valve is fully closed. In this patent the bimetal discs 19 and 20 are purposefully located in chamber 18 so they will not be influenced by the temperature of the fluid to be controlled. This is contrary to the intent and function of the thermatically controlled bypass valve, in which the bimetallic disc is actually the valve and is wetted by the fluid flow.

In an aircraft gas turbine engine, U.S. Pat. No. 4,358,925 (Williams) teaches a method for providing a temperature sensing assembly, which continuously senses the temperature of a flow of gaseous medium having a constituent stream, wherein the constituent stream has a changing temperature. In this case the temperature sensing is the action of a plurality of adjacent, captively-held bimetallic discs which contract or expand in accordance with preselected range of temperatures; a co-acting spring loaded ball valve subassembly which selectively prevents the flow of a second constituent stream of gaseous flow, in response to actuation of the temperature sensing subassembly. The principal object of this invention is to provide a temperature sensing assembly that is to be sensed continuously, and in response to said sensing, pneumatic servo-pressure is generated and is used to drive an air valve to prevent (or permit) flow of the constituent stream. While this invention has nothing to do with catalytic converters or aftertreatment, being used for aircraft turbine engines, in the thermatically controlled bypass valve the bimetallic discs, while continuously sensing and reacting to the temperature of the constituent gas, actually become the valve through which said gas flows.

U.S. Pat. No. 4,244,187 (Lane) teaches that a typical turbocharger wastegate valve is actuated by a reciprocable valve element (66) movable from a first position as shown in the drawing to a second position upon the energizing of a connected electric coil (67). In its first position with the coil de-energized, the actuator spring chamber (55) is supplied with compressor inlet vacuum, while the non-spring chamber (56) is vented to atmosphere. While this would work only on a gasoline turbocharged engine it is not possible with a Diesel engine, which has no vacuum. This patent relies on a command, initiated by engine water temperature, to energize, or de-energize and electric coil, which makes it an active, not a passive device.

Now that the invention has been described,

I claim:

1. A vehicle including
   a. an engine including a combustion gas intake and exhaust gas outlet,
   b. a turbocharger including a turbine wheel and a turbine housing having an inlet and an outlet,
   c. first exhaust piping connecting the engine exhaust to the turbocharger turbine housing inlet,
   d. an aftertreatment device (74),
   e. second exhaust piping (32) connecting the turbocharger housing outlet to the aftertreatment device,
   f. a bypass port (2) fluidly coupled to exhaust gas flow upstream of the turbine wheel, and
   g. bypass piping (68) for bypassing the turbocharger, said bypass piping connected to the bypass port and to the second exhaust piping, and
   h. a valve (1) associated with said port for blocking and unblocking said bypass port (2) thereby controlling the flow of exhaust gas to said bypass piping,
      wherein said valve (1) is a passive thermally responsive bimetallic valve in the flow of the exhaust gas and responsive to the exhaust gas temperature to unblock said bypass port (2) below a predetermined temperature and to block said bypass port (2) above a predetermined temperature.

2. The vehicle as in claim 1, wherein said valve (1) is arranged such that exhaust gas pressure provides pressure to assist in sealing the valve in the closed position.

3. The vehicle as in claim 1, wherein said valve (1) is a bi-metallic valve configured to distort thermatically to unblock the bypass port (2) below the temperature of engine exhaust at normal engine operating temperature and to block the bypass port at the temperature of engine exhaust at normal engine operating temperature.

4. The vehicle as in claim 1, wherein said aftertreatment device (74) is a catalytic converter.

5. The vehicle as in claim 1, wherein a wastegate is connected to a wastegate port between the engine and the turbocharger turbine.

6. The vehicle as in claim 1, wherein the wastegate port is also the bypass port, and wherein the passive thermally responsive valve is integrated in or connected to a wastegate valve actuator linkage (108).

7. The vehicle as in claim 1, wherein said bypass pipe is a low thermal inertia pipe.

8. The vehicle as in claim 1, wherein said bypass pipe is a thin, flexible, convoluted duct of a superalloy material.

9. The vehicle as in claim 1, wherein said bypass port is located on said turbine housing.

10. The vehicle as in claim 1, wherein said bypass port is located on said first exhaust piping.

* * * * *